United States Patent [19]

Moore

[11] 3,759,503
[45] Sept. 18, 1973

[54] RESILIENT MOUNTING ARRANGEMENT
[76] Inventor: John Russell Crompton Moore, Little Melton, Norwich, England
[22] Filed: May 27, 1971
[21] Appl. No.: 147,385

[30] Foreign Application Priority Data
May 28, 1970 Great Britain.................. 25,853/70

[52] U.S. Cl. ............................................. 267/58
[51] Int. Cl. ............................................. B60g 11/18
[58] Field of Search............................. 267/58, 155

[56] References Cited
UNITED STATES PATENTS
2,932,057  4/1960  Pemberton............................ 267/58
2,863,657  12/1958  Altherr................................. 267/58
2,701,727  2/1955  Linn..................................... 267/58
2,819,894  1/1958  Tack..................................... 267/58

Primary Examiner—Gerald M. Forlenza
Assistant Examiner—John Mannix
Attorney—Waters, Roditi, Schwartz & Nissen

[57] ABSTRACT

A resilient mounting arrangement has differential damping and comprises a helical spring under axial compression so that turns of the spring are frictionally coupled. The ends of the spring are coupled to respective relatively rotatable members. Preferably, one of the members is coupled to the associated end of the spring through inclined splines which allow relative rotation between that one member and the associated end of the spring.

14 Claims, 4 Drawing Figures

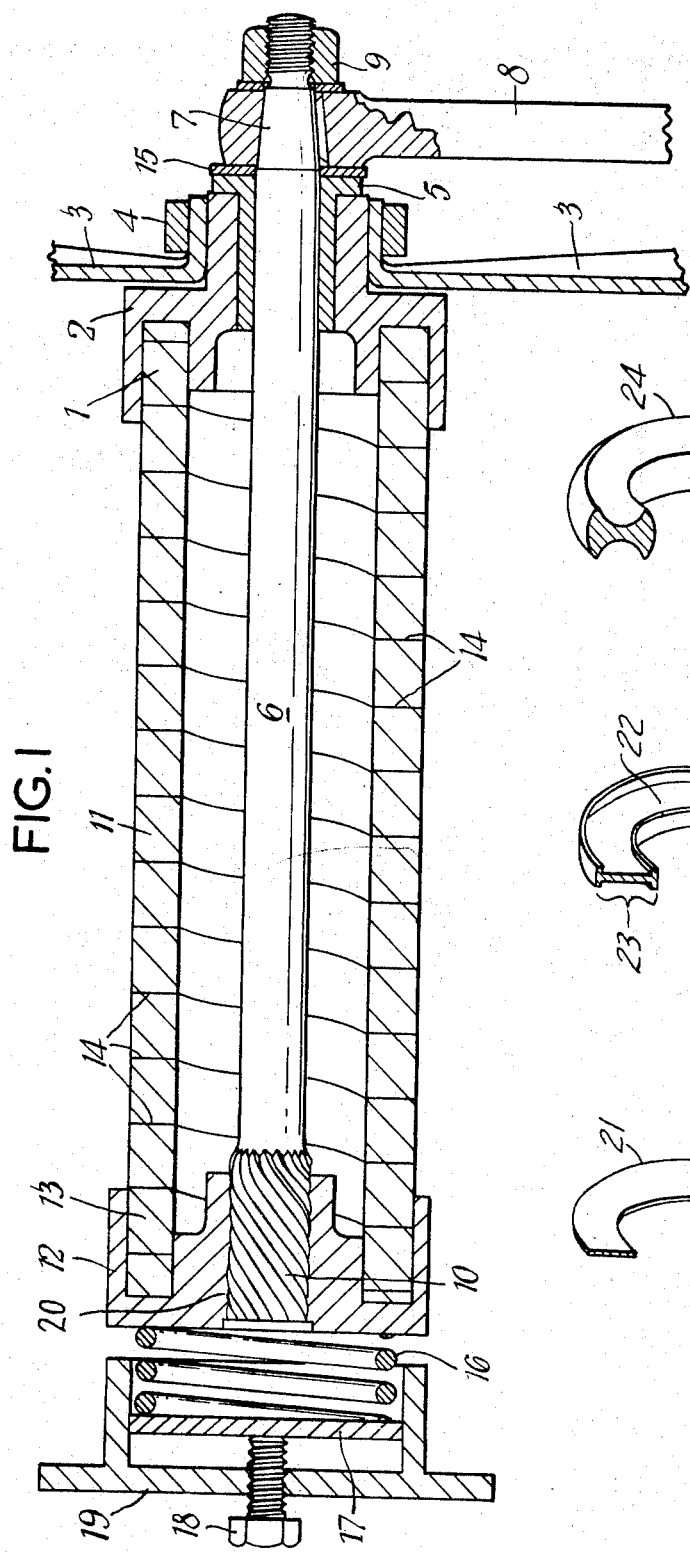

RESILIENT MOUNTING ARRANGEMENT

BACKGROUND OF THE INVENTION

The present invention relates to resilient mounting arrangements and is particularly applicable to vehicle suspensions.

In vehicle suspensions, it is known to cushion the chassis of a vehicle against shocks, which are transmitted from the road surface, by means of a helical spring. This spring is used as a compression spring and utilises its axial resilience to cushion the vehicle chassis against sudden vertical movements of the associated wheel. The two ends of the spring, whilst being relatively displaceable in the axial sense to make use of the axial resilience of the spring, are fixed relative each other in the rotational sense and, hence, no use is made of the torsional resilience of the spring.

It is also known in vehicle suspensions to provide hydraulic dampers, or so-called "shock-absorbers," which provide oscillation damping properties for a suspension.

In order to provide a relatively smooth ride it may be advantageous to provide a hydraulic damper which has a differential damping action such that less damping resistance is offered to a bump deflection than is offered to a recoil deflection.

One object of the present invention is to provide a suspension or mounting arrangement which provides differential damping without a hydraulic damper.

DISCUSSION OF THE DISCLOSURE

According to the invention there is provided a resilient mounting arrangement comprising helical spring means under axial compression so that turns thereof are frictionally coupled one to another, said spring means having its end regions coupled, respectively, to two members which are relatively rotatable to apply torsion to said spring means thereby to alter the length of the spring means and thus to displace said two members relatively to each other along the axis of the spring means, the arrangement being such that said relative rotation will be opposed by relative sliding movement of the frictionally coupled turns.

If a close-wound helical spring is loaded in torsion, that is to say about its axis from one end to the other, in the direction in which it was wound until its ends are displaced 360° from their unloaded disposition, then the spring will have gained one turn and will thus be increased in length according. Clearly, if it is loaded in the opposite or unwinding direction, to to the same extent, it will become a turn shorter. Thus, in springs so loaded, load variations may produce length variations.

If a helical spring is such that, in an unloaded condition and without an external compressive bias, it requires the application of axial tension or "stretching" to produce an open gap between turns, then it is clear that torsional displacements produce rubbing and friction between adjacent turns. Such a spring will hereinafter be referred to as a "prestressed" spring. If instead of, or in addition to, prestress within the spring an external compressive force is applied thereto, such friction between adjacent turns upon torsional displacements may be created, in the case of a naturally open spring, or may be increased, in the case of a prestressed spring. The external compressive force may be provided by supplementary means which may be situated within or outside the spring or both within and outside the spring.

To be of maximum benefit, many oscillation dampers, and particularly vehicle suspension dampers, require the differential damping action which has been mentioned hereinbefore. In general, the damping resistance offered to "bump" deflections in suspension systems should be less, and commonly very much less, than that offered to "recoil" deflections. In the case of motor car dampers, a common value of the ratio of these damping resistances is substantially 1:4.

Considering a helical spring loaded in torsion, if the torque required to overcome resilience for a given deflection be ignored, then the force remaining to be overcome in reaching said deflection will be zero if the turns are not in rubbing contact. If, however, by virtue of prestress and/or supplementary compressing means the turns rub against each other, or against spacing materials disposed between them in order to provide damping resistance, the deflecting force required will depend on, and be a function of, inter-turn pressure and friction coefficient. In such a case, the force to be applied in merely overcoming the inter-turn friction, in order to achieve a given deflection, depends upon the direction of that deflection. If that deflection tends to unwind or shorten the spring, then the deflection acts with the compressive forces. Conversely, if the deflection tends to wind-up or lengthen the spring, it will act against the compressive forces. There is accordingly differential resistance to torsional deflection in helical springs, the turns of which are under axial compression.

It is possible to alter this differential over a wide range. Springs wound edgewise with narrow rectangular section material on a substantial radius and designed for a relatively large number of turns will be of small pitch and exhibit low changes of length for a given displacement. Conversely, the use of wide material on a coarse pitch and small diameter exhibits large changes. These alterations may be yet further incrased by using interlaced springs in a configuration similar to that of multi-start screw threads or worm gears. There is thus exceptionally wide design choice in deciding the parameters by which a required differential will be produced.

Damping friction may also be varied with reference to the amount of prestress, if any, in the spring. Compressive pressure may be provided, or increased, by compressing means such as a compression spring acting outside the helical spring, an internal tension spring, or some other source of pressure. The compressing means may be fixed or adjustable in order to be able to vary the compression force exerted thereby. Compressive pressures may be provided by inter-coupling means connected to the suspensions of other wheels of a vehicle for the purpose of ride control features.

One convenient means of obtaining specific damping characteristics is to load the spring through iclined surfaces, such as skewed splines. The spring may be so arranged on a vehicle that applied torque due to bump deflections will tend to unwind and shorten the spring. The inclined surfaces may be arranged so as to readily follow-up the slight reduction of length of the spring by screw action between the inclined surfaces, the angle of inclination of which may be co-operative to a greater or lesser degree. Thus, on recoil, the spring can only resume its mean deflection and length by overcoming the angular opposition presented by the splines to the lengthening of the spring on its return movement. This opposition increases the compressive pressure in and damping resistance of the rubbing surfaces throughout the spring. Adjustment by this means is widely selectable because any angle from a wide range of angles may be selected for such inclined surfaces. Preferably the angle of inclination of the surfaces to the axis of the spring is between 30° and 40°.

The friction surfaces between the turns are also means by which control of characteristics may be effected. The spring surfaces may be treated by any of the known commerical processes for friction treatments. The spring may be interleaved with synthetic materials wound-in between the turns to provide particular friction properties, self-lubrication, protection from corrosive influences and the like. These materials may be bonded to one side of the spring surface only or may be left free to slide but retained by mechanical means.

All the methods of adjustment and control by which performance may be tailored to individual applications may be used singly or in any combination.

A serious and well known objection to friction damping which was a major influence in the widespread change to hydraulic devices some years ago was the high static breakdown resistance of friction damping arrangements. Friction materials then available had very substantial static/dynamic resistance ratios, with the result that small amplitude road shocks often failed to produce any deflection in the suspension while large bumps were grossly under-damped. There could thus arise instability on very rough surfaces and discomfort on those which are smoother.

Helical springs used in torsion do not display these properties. Friction breakdown between the surfaces of adjacent turns tends to be initiated over some very small area. This occurs when deflection forces reach values corresponding to about the same magnitude as those which would sustain dynamic breakdown, and breakdown may be propagated from that area to as many turns as become active for a given deflection. Orthodox friction dampers on the other hand necessitate simultaneous breakdown throughout the entire friction surface before a deflection can commence. Nevertheless, the combined spring and damper units proposed may be interleaved as already described, and it is now possible to obtain dynamic/static resistance ratios of the order of unity with several such materials, compounds, and surface treatments.

BRIEF DESCRIPTION OF THE DRAWINGS

For a better understanding of the invention, and to show how the same may be carried into effect, reference will now be made, by way of example, to the accompanying drawings in which:

FIG. 1 is a longitudinal section of a resilient mounting arrangement;

FIG. 2 is a sectional and perspective view of part of a first embodiment of an interleaving liner suitable for use in a resilient mounting arrangement;

FIG. 3 is a sectional and perspective view of part of a second embodiment of an interleaving liner suitable for use in a resilient mounting arrangement; and FIG. 4 is a sectional and perspective view of part of a third embodiment of an interleaving linear suitable for use in a resilient mounting arrangement.

DETAILED DESCRIPTION OF THE DRAWINGS

Referring to the sectional arrangement of FIG. 1, a rectangular section helical spring 11 is secured by an end 1 thereof in an endplate 2 which is fixed in a vehicle chassis member 3 by a clamping ring 4. The endplate 2 is provided with a bearing bush 5 supporting a shaft 6, to a tapered portion 7 of which shaft is keyed a suspension arm 8 secured by means of a nut 9. The remote end of the shaft 6 is provided with skewed splines 10 which co-operate with female splines 20 in an endplate 12 fixed to the other end 13 of the spring 11. Friction surfaces 14 may be treated or interleaved.

A spring 16 is disposed in a cylindrical housing 19 and bears against the endplate 12 in order to increase the axial compressive force on the spring 11. A bolt 18 can be adjusted to move a plate 17 backwards and forwards in the housing 19 in order to vary the compression of the spring 16.

Viewing the driving end of the device, suspension loadings applied to the arm 8 in an anti-clockwise direction will rotate splines 10 through an arc in the direction which shortens the spring 11. This will bring the end plates 2 and 12 closer together in the axial direction of the spring 11 and, in addition, relative rotation between the splines 10 and the end plate 12 will be in such a direction as to cause the splines 10 to increase their engagement with the endplate 12 by which means play or wear in the friction surfaces 14 is automatically taken up. Thrust imposed by the friction surfaces 14 is counteracted by a thrust washer 15. On recoil in the clockwise direction, axial extension of the spring 11 is resisted by additional friction forces set up at the friction surfaces 14 as a result of axial resistance exerted on the endplate 12 by the splines 10 of the shaft 6 as the end plates 2 and 12 move farther away from one another in the axial direction. Thus the damping resistance of the arrangement is increased.

FIG. 2 shows part of an interleaving linear 21 suitable for bonding to one side of the spring member interface surface. FIG. 3 shows a liner 22 with short flanges 23 for mechanical retention where it is desired to utilise the friction surfaces on both sides thereof. Where circular section springs are preferred, liners 24 may be of the section shown in FIG. 4. A liner such as 21, 22 or 24 can be provided between adjacent turns of the spring 11 shown in FIG. 1 so that, imagining the liner 21 being utilised for example, the liner provides one of the friction surfaces 14.

In automotive or other applications where the arrangement is liable to exposure and adverse working environments, protection may conveniently be afforded by fitting a flexible sleeve over the spring 11 and the splines 10 and 20. Such a sleeve may, for example, be of synthetic rubber or plastics and secured round the diameter of endplate 2 in FIG. 1 by inherent resilience or by clamping. A sleeve closed at the outer end may be charged with lubricant in order to maintain constant working conditions for the splines and inter-turn surfaces. Clearly other simple enclosures are possible.

The elimination of one component per road-wheel in vehicles together with reduced mounting requirements is obviously an economic advantage. The arrangement can reduce unsprung inertia and can provide consistent characteristics over a long life in a simple, robust product immune to the viscosity anomalies and thermal problems associated with some hydraulic dampers. The arrangement shown is compatible with conventional manufacturing practises, and can be produced easily and efficiently.

There are many applications for oscillation dampers, and emphasis on the automotive application in this description is merely for the purpose of citing a specific example that is widely known so that the construction and arrangement of the device may be the more readily understood. In addition, damping devices have applications outside the field of oscillation control per se. It may be noted that although it is highly convenient and economical in many applications to combine a restraint and an oscillation damper in one unit, thereby providing one component to serve two functions and thus reducing the mounting provisions required, the device may be so designed that its resilient forces are weak but its damping resistance is high in order to fulfil requirements calling wholly or mainly for damping and shock-absorbing.

For example, referring again to FIG. 1, if the angularity of the splines 10 with respect to the shaft 6 is sufficiently great, it is possible to provide an anti-clockwise deflection of the arm 8 at which the restoring torque of the spring 11 is not sufficient to overcome the frictional forces at surfaces 14 and to return the arm 8. Thus the arm 8 will be locked in that deflected position.

Thus deflections of the arm 8 in the anti-clockwise direction would not be self-restoring. However, they could be restored wholly or to any desired degree by rotating the arm 8 clockwise.

Such arrangements having self locking properties thus provided would be valuable in certain tool movements and mechanisms, such as clamps.

I claim:

1. A resilient mounting arrangement comprising:
   helical spring means having two opposite end regions between which are turns formed helically about an axis, said helical spring means being under axial compression so that said turns are frictionally coupled one to another;
   a first member coupled to one of said end regions of said helical spring means; and
   a second member coupled to the other of said end regions so that any relative rotation taking place betwen said first and second members about said axis will cause relative displacement between said first and second members in the direction of said axis and will apply torsion to said helical spring means about axis and in opposition to sliding friction between said turns.

2. A resilient mounting arrangement as claimed in claim 1, wherein said second member is coupled to said other end region through surfaces which are inclined relative to said axis.

3. A resilient mounting arrangement as claimed in claim 2, wherein said surfaces are inclined in such a sense that, when relative rotation takes place between said first and second members in a sense tending to unwind said helical spring means, the torsional stress in said helical spring means will tend to cause said one end region to rotate relative to said second member in a direction in which said inclined surfaces will co-operate in a manner axially to shorten said helical spring means.

4. A resilient mounting arrangement as claimed in claim 1, wherein said helical spring means has axial resilience providing at least some of said axial compression.

5. A resilient mounting arrangement as claimed in claim 1, comprising compressing means for producing at least some of said axial compression.

6. A resilient mounting arrangement as claimed in claim 5, wherein said compressing means is a compression spring means arranged externally of said helical spring means and urging said helical spring means into compression.

7. A resilient mounting arrangement as claimed in claim 1, wherein said helical spring means, where said turns are frictionally coupled, is treated to define a damping characteristic for said resilient mounting arrangement.

8. A resilient mounting arrangement as claimed in claim 1, wherein said spring means has lining means disposed between said turns to determine the damping characteristics of said resilient mounting arrangement.

9. A resilient mounting arrangement as claimed in claim 8, wherein said lining means is bonded to one turn of each pair of adjacent ones of said turns.

10. A resilient mounting arrangement as claimed in claim 8, wherein said lining means comprises surface portions which are formed to locate said lining means with ones of said turns which are adjacent said lining means.

11. A resilient mounting arrangement as claimed in claim 3, comprising a coupling member attached to said other end region, said second member being a shaft and being coupled to said coupling member through said surfaces.

12. A resilient mounting arrangement as claimed in claim 11, wherein said shaft extends through said helical spring means and through said first member.

13. A resilient mounting arrangement as claimed in claim 2, wherein said surfaces are defined by splines arranged on said second member and co-operable splines associated with said other end region.

14. A resilient mounting arrangement as claimed in claim 1, wherein said second member is coupled to said other end region by mutually co-operable splines some of which are arranged on said second member and others of which are associated with said other end region.

* * * * *